H. RICHMOND.
Toy Dust Pan and Brush.
No. 219,875. Patented Sept. 23, 1879.
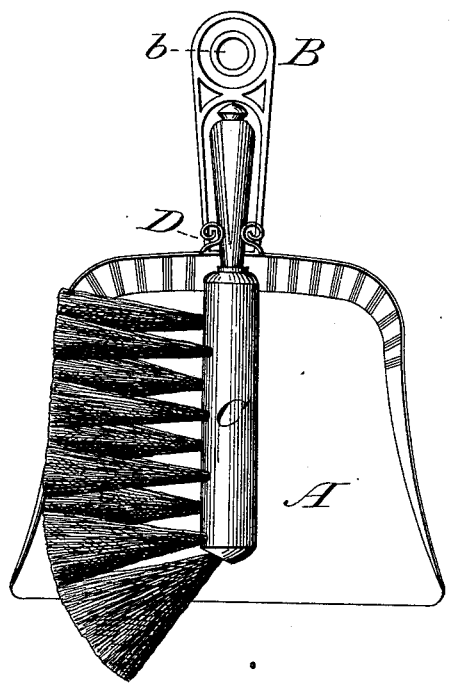
Attest:
Wm. J. Fryer, Jr.
E. J. Richmond, Jr.
Inventor:
Henry Richmond

UNITED STATES PATENT OFFICE.

HENRY RICHMOND, OF NEW YORK, N. Y.

IMPROVEMENT IN A TOY DUST PAN AND BRUSH.

Specification forming part of Letters Patent No. 219,875, dated September 23, 1879; application filed January 30, 1879.

*To all whom it may concern:*

Be it known that I, HENRY RICHMOND, brush-manufacturer, of No. 205 Centre street, in the city of New York, county and State of New York, have invented a new and useful Improvement in a Toy Dust Pan and Brush, of which the following is a specification, reference being had to the drawing, which shows a front view of the pan and brush.

A is the dust-pan. B is the handle of the pan. C is the brush. D is the device for clutching the handle of the brush and holding the same to the pan.

I make the dust-pan of sheet metal, its outlines to conform to any of the usual shapes of dust-pans. The brush I make of the same shape and same materials as ordinary dust-brushes are made. The handle of the pan I depress, the better to permit the handle of the brush to lie in the same. Projecting from the face of the handle of the pan I use a catch, D, forming the same of wire, bent to the shape shown, and soldered fast. The wire catch has sufficient elasticity to retain the brush securely after the handle of the same has been pressed into its proper place. The handle of the pan is made sufficiently long to allow of an opening in its upper end, b, for the purpose of hanging up the combined articles.

By having the brush lie on the face of the pan, and attached thereto by a simple and sightly device, I make a useful, novel, attractive, and salable article of manufacture.

I claim as my invention—

A combined toy dust pan and brush in which the handle of the pan is made with a depressed face, and having a wire catch, D, to hold the brush to the pan, all as herein described and set forth.

HENRY RICHMOND.

Witnesses:
 WM. J. FRYER, Jr.,
 E. J. RICHMOND, Jr.